United States Patent Office 2,839,510
Patented June 17, 1958

2,839,510

1,2,4- AND 1,3,5-TRIMETHYLENECYCLOHEXANES AND 1,3,5,7-TETRAMETHYLENECYCLOOCTANE, THEIR PREPARATION FROM ALLENE, AND POLYMERS OF 1,2,4-TRIMETHYLENECYCLOHEXANE

Richard E. Benson, Claymont, Del., assignor to E. I. du Pont de Nemours and Company, Wilmington, Del., a corporation of Delaware No Drawing. Application October 10, 1956
Serial No. 615,015

19 Claims. (Cl. 260—82.1)

This invention relates to new unsaturated cyclic compounds and a method for preparing these new compounds. More particularly, it relates to unsaturatd derivatives of cyclohexane and of cyclooctane, to polymers thereof, and to a novel catalytic method of preparing these unsaturated cyclic compounds from allene.

Allene has previously been subjected to non-catalyzed, thermal polymerization by heating it for several days at 140–150° C. (Lebedev, Chemisches Zentralblatt 1914, I, 1410). This reaction yielded cyclic allene polymers, including a trimer. This trimer, however, had the structure of a dimethylenespirocyclobutane, and therefore differed fundamentally from the unsaturated derivatives of cyclohexane obtained by the catalyzed trimerization process of this invention.

It is an object of this invention to provide new unsaturated cyclic compounds and a method for their preparation. A further object is to provide new unsaturated derivatives of cyclohexane. Another object is to provide novel polymeric products which are the polymers and copolymers of these new unsaturated derivatives of cyclohexane. A still further object is to provide a novel catalytic method of preparing new unsaturated cyclic compounds from allene. Other objects will appear hereinafter.

These and other objects of this invention are accomplished by providing trimethylenecyclohexanes in which at most two of the methylene groups are attached to adjacent ring carbon atoms. These new products are 1,2,4-trimethylenecyclohexane and its isomer 1,3,5-trimethylenecyclohexane and can be represented respectively by the following formulas:

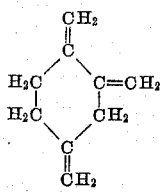

1, 2, 4-trimethylenecyclohexane

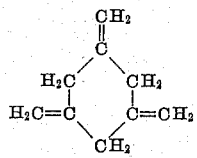

1, 3, 5-trimethylenecyclohexane

Also included in this invention is an allene tetramer, 1,3,5,7-tetramethylenecyclooctane.

The trimethylenecyclohexanes of this invention are trimers of allene and have the empirical formula $C_9H_{12}$. The new allene polymers i. e., the trimethylenecyclohexanes and tetramethylenecyclooctane of this invention are prepared by a method which comprises heating allene, $CH_2=C=CH_2$, as essentially the sole aliphatically unsaturated reactant present, at a temperature in the range of 70–130° C. and in intimate contact with a catalytic amount of a complex of nickel carbonyl with an organic phosphine or phosphite, this complex having the formula $[(RO_m)_3P]_2Ni(CO)_2$, where $m$ is a cardinal number from 0 to 1 and R is a hydrocarbon radical free from aliphatic unsaturation, and isolating the trimethylenecyclohexanes and the tetramethylenecyclooctane as the resulting products.

The trimerization of allene with a nickel carbonyl/phosphite or nickel carbonyl/phosphine catalyst can be represented schematically as follows:

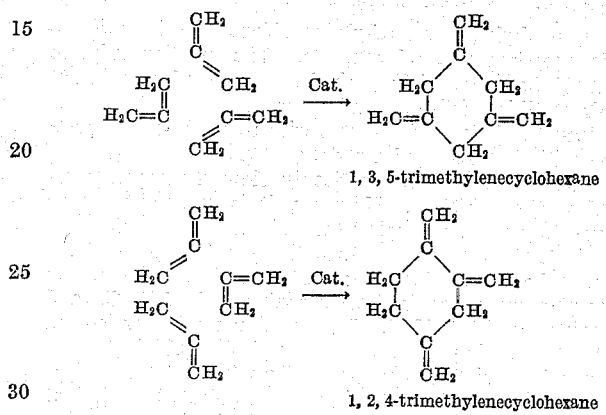

This invention also includes as new products the polymers, including homopolymers and copolymers, of 1,2,4-trimethylenecyclohexane. These polymers possess valuable air-drying properties and are useful as films, coatings, and the like.

The catalysts specifically effective for the trimerization of allene are the complexes of nickel carbonyl with phosphines, $R_3P$, or phosphites, $(RO)_3P$, where R is a hydrocarbon radical free from aliphatic unsaturation, e. g., an alkyl, aryl, aralkyl or cycloalkyl radical. The nickel carbonyl/phosphine complexes have the general formula $(R_3P)_2Ni(CO)_2$. These compounds are described in the literature, for example by Reppe et al. in Ann. 560, 104 (1948). The nickel carbonyl/phosphite complexes have the general formula $[(RO)_3P]_2Ni(CO)_2$, and they also are described in the literature (Reed, J. Chem. Soc. 1954, 1940). This class of catalysts is represented by the generic formula $[(RO_m)_3P]_2Ni(CO)_2$, where $m$ is 0 or 1 and R is a hydrocarbon radical free from aliphatic unsaturation, usually of not more than 7 carbon atoms. The most stable of these complexes are those having the formula just given, which are prepared by the combination, with evolution of two moles of carbon monoxide, of two moles of the phosphine or phosphite with one mole of nickel carbonyl. However, less well-defined complexes can be prepared by reacting more or less than two moles of phosphine or phosphite with one mole of nickel carbonyl. The resulting products, containing complexes which may be represented by the formula $$[(RO_m)_3P]_nNi(CO)_{4-n}$$

where $n$ is 1, 2 or 3, $m$ is 0 or 1, and R is defined as aforesaid, are also effective as catalysts in the process of this invention.

Illustrative catalysts suitable for use in the process of this invention are bis(triphenyl phosphite)nickel dicarbonyl, bis(tritolyl phosphite)nickel dicarbonyl, bis(trimethyl phosphite)nickel dicarbonyl, bis(tribenzyl phosphite)nickel dicarbonyl, bis(triethyl phosphite)nickel dicarbonyl, bis(tricyclohexyl phosphite)nickel dicarbonyl, bis(tritolyl phosphite)nickel dicarbonyl, bis(triphenylphosphine)nickel dicarbonyl, and the like. The bis(triaryl phosphite)nickel dicarbonyls are in general preferred, particularly wherein the aryl radical is of not more than 7 carbon atoms. The catalyst need be used only in very small amounts, e. g., in amounts such that there is present from about 0.001 to 0.05 gram-atom of nickel per mole of allene. Higher amounts can be used but it is unnecessary to do so.

The reaction can proceed without diluent or solvent. In general, however, it is preferred to employ a liquid reaction medium. For this purpose, any substantially anhydrous organic liquid which is inert, i. e., essentially unreactive with the reactants or reaction product can be used. The preferred reaction media are those liquids which contain no active hydrogen atoms, i. e., which do not evolve gas in the Zerewitinoff test for active hydrogen. Suitable reaction media include ethyl acetate, methylal, tetramethylene sulfone, tetrahydrofuran, dioxane, benzene, toluene, etc. The reaction mixture should be substantially anhydrous. In order to insure this condition, it is often advantageous to add to it some calcium carbide, which reacts with traces of water present with formation of acetylene.

The reaction is impracticably slow at temperatures below about 70° C. However, it is recommended to avoid temperatures higher than about 130° C. since, at such temperatures, the formation of higher polymers and other by-products becomes excessive. The proper temperature range is therefore about 70–130° C., and preferably 100–125° C. The reaction can be carried out at atmospheric pressure, for example by bubbling allene through a suitable reaction medium kept at the desired temperature and containing the catalyst in solution. However, higher conversions are obtained by operating in closed, pressure-resistant vessels. In such closed systems, the reaction can be carried out at the autogenous pressure developed by the reactants at the operating temperature, or additional pressure e. g. from 5–200 atmospheres of an unreactive gas such as nitrogen can be used if desired. The reaction is normally substantially completed within 2–8 hours at reaction temperatures.

The reaction product is separated from the solvent, if any, and from the higher boiling materials by fractional distillation. Infrared analysis shows absorption in the double bond region corresponding to the trimethylene-cyclohexane structure. The nuclear magnetic resonance spectrum indicates that the product is a mixture of 1,2,4- and 1,3,5-trimethylenecyclohexane in which the former predominates, being present to the extent of approximately 75–85%. This is confirmed by catalytic hydrogenation, which yields principally cis- and trans-1,2,4-trimethylcyclohexanes, and by isomerization to a mixture comprising chiefly 1,2,4-trimethylbenzene, with lesser amounts of 1,3,5-trimethylbenzene. The mixture of trimethylenecyclohexanes can be separated by gas chromatographic analysis, which indicates that it consists of approximately 80% of 1,2,4-trimethylenecyclohexane and 20% of 1,3,5-trimethylenecyclohexane.

In spite of their high degree of unsaturation, the trimethylenecyclohexanes have reasonably good heat stability and can be stored for long periods of time in the absence of oxygen.

However, 1,2,4-trimethylenecyclohexane can be polymerized at low or moderate temperatures, e. g., in the temperature range from —80 to 100° C., under the influence of ionic polymerization catalysts, such as the halides of metals of groups III and IV (e. g., aluminum chloride, aluminum bromide, titanium tetrachloride, tin tetrachloride), sulfuric acid, boron trifluoride, and the like, or of the more recently developed coordination catalysts such as the titanium tetrachloride/aluminum trialkyl complexes. The polymers range in consistency from viscous liquids to low melting resins, soluble in the common organic solvents such as benzene, toluene, carbon disulfide, methyl ethyl ketone, etc. Under these conditions, 1,3,5-trimethylenecyclohexane does not polymerize appreciably. Its presence in the mixture does not prevent the polymerization of the 1,2,4 isomer, which is the predominant component.

Infrared analysis of the polymeric product indicates a structure having the recurring unit.

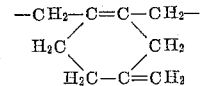

These polymers are of considerable technical interest because they contain unsaturated groups whch are available as reactive sites for crosslinking reactions. For example, they are capable of rapid air-drying without appreciable development of color to give hard, glossy structures such as coatings or self-supporting films, insoluble in the solvents in which the polymer was initially soluble and resistant to chemical attack.

Furthermore, 1,2,4-trimethylenecyclohexane can be copolymerized with other monomers amenable to ionic polymerization, these being principally the olefins and haloolefins, such as ethylene, propylene, isobutylene, styrene, alpha-methylstyrene, 1,3-butadiene, isoprene, 2-chloro-1,2-butadiene, etc. and the vinyl alkyl ethers, such as vinyl methyl ether, vinyl ethyl ether, and the like polymerizable ethylenically unsaturated monomers. Preferred comonomers for polymerization with 1,2,4-trimethylenecyclohexane are the olefins of 4 to 8 carbon atoms having a terminal methylene group. For appreciable modification of the properties through the presence of trimethylenecyclohexane units, the copolymers should contain at least 3% and preferably at least 5% by weight of polymerized trimethylenecyclohexane. The copolymers thus obtained are also capable of crosslinking, for example, through oxidation, to give polymers of varying degree of hardness and resistance to solvents and chemicals.

The invention is illustrated in greater detail in the following examples:

*Example I*

A stainless steel pressure vessel having a capacity of 1.4 liters was charged under nitrogen with 250 ml. of anhydrous tetrahydrofuran, 10 g. of calcium carbide (to insure anhydrous conditions) and 5 g. of bis(triphenyl phosphite)nickel dicarbonyl [$(C_6H_5O)_3P]_2Ni(CO)_2$. The vessel was flushed with nitrogen, cooled in a carbon dioxide/acetone bath and evacuated. Allene (100 g.) was distilled into the vessel, which was then sealed, equipped with a pressure gauge and place in a rocker. The vessel was heated with agitation to 80° C. over two hours and the temperature was then increased slowly until the reaction began, as indicated by a pressure drop. Heating was continued at 108–109° C. for 5.5 hours, during which time the pressure fell from 178 to 20 lb./sq. in. The vessel was then opened and its contents (326 g.) were combined with the product of a similar run in which 80 g. of allene was used.

The reaction product was separated from the calcium carbide by decantation, petroleum ether was added, and the organic layer was washed four times with water. The organic solution was dried with magnesium sulfate and distilled through a short column. The fraction boiling from 58° C. at 200 mm. to 62° C. at 0.1 mm. was collected (112 g.) and there was 66.8 g. of a viscous, brown material remaining in the still pot. The distillate was treated with phenothiazine to inhibit polymerization and redistilled through an efficient fractionating column. There was obtained approximately 65 g. of trimethylene-cyclohexane as a colorless liquid boiling at 67.5–69° C. at 60 mm. pressure, $n_D^{25}$ 1.4912–1.4919.

*Analysis.*—Calc'd for $C_9H_{12}$: C, 89.94; H, 10.06; g. $H_2$/g. sample (3 double bonds), 0.0503. Found: C, 90.03; H, 10.19; g. $H_2$/g. sample, 0.0476 (94% of theoretical).

The infrared spectrum of the fraction boiling at 68° C. at 60 mm., $n_D^{25}$ 1.4919, showed absorption in the double bond region at 6.05, 6.10, 11.25 and 11.27μ, in agreement with the trimethylenecyclohexane structure. The nuclear magnetic resonance spectrum indicated that the product contained approximately 85% of 1,2,4-trimethylenecyclohexane and 15% of 1,3,5-trimethylenecyclohexane.

The mixture of isomers obtained as described above was separated into its components by means of gas chromatography, using the general technique described by N. H. Ray in J. App. Chemistry 4, 21 (1954). The instrument used was designed after the commercially available Perkin Elmer vapor fractometer except that a split gas line was used and a filament was used as the sensing element. The carrier gas was helium (50 cc./minute), the tube temperature was 93° C., and the tube packing was diatomaceous earth, using dimethyltetramethylene sulfone as the non-mobile phase. Ten runs were made (0.02 cc. of isomer mixture per run) and two fractions, I and II, were collected in separate traps at −60° C.

Fraction I, which constituted approximately 50% of the total, was shown by nuclear magnetic resonance and infrared spectra to be pure 1,2,4-trimethylenecyclohexane. Fraction II, also about 50% of the total, was similarly shown to consist of 1,3,5-trimethylenecyclohexane, still containing some of the 1,2,4-isomer. Integration of the tracing made by the recording instrument showed that the initial mixture consisted of about 80% of 1,2,4-trimethylenecyclohexane and about 20% of 1,3,5-trimethylenecyclohexane.

The reaction product from another preparation was further identified as follows:

Hydogenation in ethanol solution, initially with Raney nickel catalyst and finally with platinum-on-charcoal catalyst at room temperature and 40 lb./sq. in. hydrogen pressure gave a colorless liquid, B. P. 65–68° C. at 57 mm., which was identified by infrared analysis as principally cis- and trans-1,2,4-trimethylcyclohexane.

Isomerization of the same reaction product in chloroform solution in the presence of p-toluene-sulfonic acid as the catalyst gave a colorless liquid, B. P. 72° C. at 28 mm., $n_D^{25}$ 1.5013, which was identified by infrared analysis as consisting of approximately 75% 1,2,4-trimethylbenzene and 25% 1,3,5-trimethylbenzene.

The higher boiling product obtained in the trimerization of approximately 300 g. of allene (in three separate runs) at 105–115° C. in the presence of bis(triphenyl phosphite)nickel dicarbonyl was distilled through an 8″ Vigreux column to give 18.5 g. of colorless liquid, B. P. 45–70° C. at 1 mm. pressure. The distillate was refractionated through a small spinning band column to give approximately 10 g. of a colorless liquid, B. P. 60° C. at 2.5 mm., $n_D^{25}$ 1.5091–1.5104, having the composition of an allene tetramer.

Analysis.—Calc'd for $C_{12}H_{16}$: C, 89.94; H, 10.07; mol. wt., 160; g. $H_2$/g. sample (4 double bonds) 0.0503. Found: C, 90.16; H, 10.24; mol. wt., 147; g. $H_2$/g. sample, 0.0428.

The infrared, ultraviolet and nuclear magnetic resonance spectra indicated that this material was 1,3,5,7-tetramethylenecyclooctane.

This tetramer is capable of air-drying to insoluble polymers, suitable for use in coatings on surfaces such as steel, glass, etc. For example, a small amount of a commercial cobalt-drying agent was added to a sample of 1,3,5,7-tetramethylenecyclooctane and the resulting solution was flowed out on a glass plate which was exposed to the air at room temperature of 18–25° C. After 16–18 hours, the liquid had set to a solid film which was nearly dry to the touch and was insoluble in toluene, although softened by it. After 5 days the film was dry to the touch and tack free, and after 7 days it was no longer softened by toluene.

Example II

A stainless steel pressure vessel having a capacity of 500 ml. was charged, by the procedure described in Example I, with 5 g. of bis(triphenyl phosphine)nickel dicarbonyl, $[(C_6H_5)_3P]_2Ni(CO)_2$, 10 g. of calcium carbide, 150 ml. of anhydrous tetrahydrofuran and 44 g. of allene. The vessel was heated with agitation to 72° C. over four hours, then to 85° C. over one-half hour, and held at 85° C. for 9.5 hours, during which time the pressure in the vessel fell from 103 to 20 lb./sq. in.

The reaction product was separated from the calcium carbide by decantation, treated with 0.5 g. of phenothiazine, and the solvent was separated by distillation. The fraction of the reaction product distilling in the range of 50–100° C. at a pressure between 200 mm. and 1 mm. was redistilled through a small spinning band column. There was obtained 2 g. of the same trimethylenecyclohexane as in Example I, B. P. 60° C. at 46 mm. pressure, $n_D^{25}$ 1.4920, and approximately 12 g. of higher boiling material.

Example III

A 1.5 g. sample of trimethylenecyclohexane (mixed isomers obtained as in Example I) dissolved in 10 ml. of dry cyclohexane was treated with a catalyst consisting of 0.01 ml. of titanium tetrachloride and 0.4 ml. of a cyclohexane solution of aluminum triisobutyl. The mixture warmed up spontaneously and a dark color developed. The mixture was allowed to stand at room temperature for 1.5 hours, during which time some solid material separated. The reaction mixture was poured into methanol and the solid polymer which precipitated was separated by filtration, washed with methanol and dried. There was obtained 0.7 g. of polymeric 1,2,4-trimethylenecyclohexane melting above 270° C. This product was almost completely soluble in xylene. It was purified by dissolving it in xylene and pouring the solution into methanol. The resulting white solid polymer was cast into films from a toluene solution containing a trace of a cobalt drying agent. Upon air-drying for 15–20 hours, the film became insoluble in boiling xylene. The insolubilized film showed good resistance to water and soap solution.

Example IV

A 10% solution of trimethylenecyclohexane (mixed isomers) in petroleum ether was cooled to −60° C. in an atmosphere of nitrogen and treated with a trace of gaseous boron trifluoride. An orange color developed in the mixture, which was then allowed to warm to room temperature and left at that temperature for about 16 hours. At the end of that time, polymeric trimethylenecyclohexane had separated as a soft solid readily soluble in warm xylene, from which it could be reprecipitated by addition of methanol.

Example V

A stainless steel pressure vessel of 500 ml. capacity was flushed with argon and charged with 7.7 g. of trimethylenecyclohexane (mixed isomers), 50 ml. of dry cyclohexane and 3.2 g. of lithium wire cut in small pieces as polymerization catalyst. A number of small stainless steel balls were added to exert a shearing action on the lithium and keep fresh surfaces exposed. The vessel was sealed, cooled in a carbon dioxide/acetone bath, evacuated, and 50 g. of 1,3-butadiene was distilled into it. It was then heated to 45° C. with agitation. After about one hour the internal temperature rose suddenly to 115° C. then slowly fell to 45–50° C., and the vessel was maintained at that temperature for 16 hours.

The reaction product was a viscous, rubbery copolymer, the bulk of which was soluble in toluene. The toluene-soluble polymer was precipitated from the solution by pouring it into methanol and was thus obtained as a white semisolid. This polymer was redissolved in toluene and a small amount of a cobalt drying agent was added to the solution, which was cast onto a phosphatized steel panel. After drying in air at room temperature for 1.5 hours, the resulting copolymer film was tough and glossy, and had lost its initial solubility in toluene.

The infrared analysis of another copolymer prepared in a somewhat similar manner from 1,2,4-trimethylenecyclohexane and 1,3-butadiene in 1:10 ratio showed the presence of methylene groups, internal ring unsaturation, and vinyl groups, indicating that the material was in fact a copolymerization product of the two components. The copolymer air-dried rapidly to give glassy films showing greater stability on accelerated exposure tests than films of unmodified poly-1,3-butadiene.

An interesting and valuable property of 1,2,4-trimethylenecyclohexane is its ability to enter into a Diels-Alder reaction with the unsaturates normally used as dienophiles in this reaction such as methyl acrylate, methyl methacrylate, acrylonitrile tetracyanoethylene, etc. The reaction is carried out in the absence of a polymerization catalyst and preferably in the presence of a polymerization inhibitor. The products are substituted 6-methylene-1,2,3,4,5,6,7,8-octahydronaphthalenes of the general formula

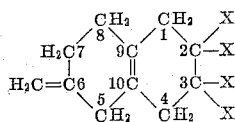

where at least one of the X's is a group containing a multiple linkage alpha to the ring carbon, e. g., carbomethoxy or cyano, the others being hydrogen or hydrocarbon groups. These adducts, in addition to the reactive X groups, possess a methylene group. This structure confers air-drying properties to the monomers. These adducts and their preparation are disclosed and claimed in my copending patent application Ser. No. 617,236, filed October 22, 1956.

As has been shown, 1,2,4-trimethylenecyclohexane is useful as a source of crosslinkable polymers which, on air-drying or moderate baking, set very quickly to hard polymers resistant to organic solvents and other chemical agents. For this purpose, the isomeric mixture obtained by trimerization of allene, in which the 1,2,4 isomer predominates, can be employed directly. These polymers are of special value as paint vehicles and coating compositions for application to surfaces such as wood or plaster and particularly metals, e. g., autobodies, refrigerators, furniture, etc. The trimethylenecyclohexanes are also useful as a convenient source of trimethylbenzenes through their ready and essentially quantitative isomerization. As is known, 1,2,4-trimethylbenzene (pseudocumene) and 1,3,5-trimethylbenzene (mesitylene) are valuable aromatic solvents with higher boiling points than toluene or the xylenes. In view of their reactive methylene groups, the trimethylenecyclohexanes are further useful as intermediates in the preparation of many valuable derivatives.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A trimethylenecyclohexane in which at most two of the methylene groups are attached to adjacent ring carbon atoms and in which the methylene groups are the only substituents on the ring carbons.
2. 1,2,4-trimethylenecyclohexane.
3. 1,3,5-trimethylenecyclohexane.
4. 1,3,5,7-tetramethylenecyclooctane.
5. A polymer of trimethylenecyclohexane isomers in which at most two of the methylene groups are attached to adjacent ring carbon atoms and in which the methylene groups are the only substituents on the ring carbons.
6. A homopolymer of 1,2,4-trimethylenecyclohexane.
7. A copolymer of 1,2,4-trimethylenecyclohexane and an olefin having a terminal methylene group.
8. A copolymer of 1,2,4-trimethylenecyclohexane and an olefin of 4 to 8 carbon atoms having a terminal methylene group.
9. A copolymer of 1,2,4-trimethylenecyclohexane and 1,3-butadiene.
10. Process for preparing allene polymers which comprises heating allene as essentially the sole aliphatically unsaturated reactant present, at a temperature in the range of 70 to 130° C. and in intimate contact with a catalyst selected from the class consisting of nickel carbonyl/phosphine and nickel carbonyl/phosphite complexes having the general formula $$[(RO_m)_3P]_nNi(CO)_{4-n}$$

where $m$ is a cardinal number from 0 to 1, $n$ is a positive integer from 1 to 3, and R is a hydrocarbon radical free from aliphatic unsaturation, and obtaining an allene polymer as the resulting product.

11. Process for preparing trimethylenecyclohexanes which comprises heating allene as essentially the sole aliphatically unsaturated reactant present, at a temperature in the range of 70 to 130° C. and in intimate contact with a nickel carbonyl/phosphine complex having the general formula $(R_3P)_2Ni(CO)_2$ where R is a hydrocarbon radical free from aliphatic unsaturation, and obtaining a trimethylenecyclohexane as the resulting product.

12. Process for preparing trimethylenecyclohexanes which comprises heating allene as essentially the sole aliphatically unsaturated reactant present, at a temperature in the range of 70 to 130° C. and in intimate contact with a nickel carbonyl/phosphite complex having the general formula $[(RO)_3P]_2Ni(CO)_2$ where R is a hydrocarbon radical free from aliphatic unsaturation, and obtaining a trimethylenecyclohexane as the resulting product.

13. Process for preparing trimethylenecyclohexanes as set forth in claim 10 wherein allene is heated at a temperature within the range of 100 to 125° C.

14. Process for preparing trimethylenecyclohexanes which comprises heating allene as essentially the sole aliphatically unsaturated reactant present, at a temperature in the range of 70 to 130° C. and in intimate contact with a bis(triphenyl phosphite)nickel dicarbonyl catalyst having the formula $[(C_6H_5O)_3P]_2Ni(CO)_2$, and obtaining a trimethylenecyclohexane as the resulting product.

15. Process for preparing trimethylenecyclohexanes which comprises heating allene as essentially the sole aliphatically unsaturated reactant present, at a temperature in the range of 70 to 130° C. and in intimate contact with a bis(triphenyl phosphine)nickel dicarbonyl catalyst having the formula $[(C_6H_5)_3P]_2Ni(CO)_2$, and obtaining a trimethylenecyclohexane as the resulting product.

16. A mixture of allene polymers comprising essentially 1,2,4-trimethylenecyclohexane, 1,3,5-trimethylenecyclohexane and 1,3,5,7-tetramethylenecyclooctane.

17. A composition comprising 1,3,5,7-tetramethylenecyclooctane and a metal drier.

18. The reaction product obtained by heating allene as set forth in claim 10.

19. A methylene substituted cyclic compound selected from the group consisting of 1,2,4-trimethylenecyclohexane, 1,3,5-trimethylenecyclohexane, and 1,3,5,7-tetramethylenecyclooctane.

(References on following page)

References Cited in the file of this patent

UNITED STATES PATENTS

| | | |
|---|---|---|
| 2,600,454 | Wicklatz et al. | June 17, 1952 |
| 2,601,075 | Wicklatz et al. | June 17, 1952 |

OTHER REFERENCES

Reed: J. Chem. Soc. 1954, 1940.
Lebedev: Chemisches Zentralblatt 1914, I, 1940.
Reppe: Annalen 560, 104 (1948).

U. S. DEPARTMENT OF COMMERCE
PATENT OFFICE

CERTIFICATE OF CORRECTION

Patent No. 2,839,510     Richard E. Benson     June 17, 1958

It is hereby certified that error appears in the printed specification of the above numbered patent requiring correction and that the said Letters Patent should read as corrected below.

Column 2, line 72, for "bis(tritolyl phosphite)nickel dicarbonyl," read -- bis(tributylphosphine)nickel dicarbonyl, --; column 4, line 52, for "place" read -- placed --; column 5, line 35, for "Hydogenation" read -- Hydrogenation --.

Signed and sealed this 5th day of August 1958.

(SEAL)

Attest:
KARL H. AXLINE
Attesting Officer

ROBERT C. WATSON
Commissioner of Patents